United States Patent [19]

Suhoza et al.

[11] Patent Number: 5,156,762

[45] Date of Patent: Oct. 20, 1992

[54] SYNERGISTIC STABILIZER COMPOSITIONS FOR POLYOLS AND POLYURETHANE FOAM

[75] Inventors: Richard A. Suhoza; Bruce R. Garney, both of Norwalk; Robert B. Lauder, Fairfield, all of Conn.

[73] Assignee: R. T. Vanderbilt Company, Inc., Norwalk, Conn.

[21] Appl. No.: 868,052

[22] Filed: Apr. 13, 1992

Related U.S. Application Data

[62] Division of Ser. No. 836,486, Feb. 28, 1992.

[51] Int. Cl.$^5$ .............................. C09K 3/00
[52] U.S. Cl. ..................... 252/182.26; 252/182.27; 252/390; 252/393; 252/394; 252/403; 252/609; 521/115; 521/128; 521/129; 521/906
[58] Field of Search ............... 252/182.26, 182.27, 252/390, 393, 394, 403, 609

[56] References Cited

U.S. PATENT DOCUMENTS

| | | | |
|---|---|---|---|
| 2,530,769 | 11/1950 | Hollis | 252/401 |
| 3,214,397 | 10/1965 | Cox | 260/2.5 |
| 4,010,211 | 3/1977 | Preston et al. | 260/611.5 |
| 4,265,783 | 5/1981 | Hinze | 252/182 |
| 4,275,173 | 6/1981 | Hinze | 521/117 |
| 4,677,154 | 6/1987 | Narayan et al. | 524/710 |
| 4,933,374 | 6/1990 | Suhoza et al. | 521/129 |

OTHER PUBLICATIONS

K. C. Frisch and J. H. Saunders, ed., Plastic Foams, Part 1, 118–125 (1972).

G. L. Statton and J. M. Gaul, *Evaluation of Hindered Phenols for Minimization of Foam Discoloration Using the Microwave Scorch Test*, 20 J. Cellular Plastics, 346–50 (1984).

*Primary Examiner*—Morton Foelak
*Attorney, Agent, or Firm*—Rasma B. Balodis

[57] ABSTRACT

Polyether polyols and polyurethane foams are stabilized by including therein a liquid stabilizer composition of (a) 2,6-di-tert-butyl-4-sec-butylphenol, (b) a reaction product of diisobutylene, styrene and diphenylamine and (c) phenothiazine or $C_{9-26}$-alkyl substituted phenothiazone and wherein the ratio of the phenol to the reaction product is about 1:5 to 5:1 and the ratio of the mixture of components (a) and (b) to the phenothiazone compound is about 5.0:0.1 to 4.0:1.0. The stabilizer composition may further contain trihydrocarbyl phosphite to stabilize the color of same.

6 Claims, No Drawings

SYNERGISTIC STABILIZER COMPOSITIONS FOR POLYOLS AND POLYURETHANE FOAM

This is a division of application Ser. No. 07/836,486 filed Feb. 28, 1992.

BACKGROUND OF THE INVENTION

The present invention concerns stabilization of polyoxyalkylene polyether polyols and the use of the stabilized polyols in the preparation of polyurethane foam. In particular the invention relates to stabilization of polyols with certain liquid stabilizer compositions and the color or scorch inhibition of flexible and semiflexible polyurethane foams made from the stabilized polyols.

Prior art methods for stabilization of polyoxyalkylene polyether polyols with solid antioxidants or stabilizers and the use of the stabilized polyols in the preparation of polyurethane foams to inhibit scorch are well known.

Conventional solid stabilizers are generally dissolved in the polyol media by heating. To remove any undissolved stabilizer solids, the entire voluminous polyol mass is subjected to a filtration step. Then the polyol precursor can be processed into the final foam product.

U.S. Pat. No. 4,933,374 discloses a liquid stabilizer composition composed of 2,6-di-tert-butyl-4-sec-butylphenol and a reaction product of diisobutylene, styrene and diphenylamine. The liquid stabilizer eliminates certain processing disadvantages associated with solid stabilizer systems. The liquid stabilizer compositions are readily soluble in the polyol media at ambient temperatures. Consequently, two steps of the conventional process may be eliminated: dissolution of the stabilizer in the polyol media by heating and removal of undissolved stabilizer solids by filtration. Furthermore, the liquid stabilizer compositions may be added to the polyol by metering or pumping for convenience and safety.

Another known scorch inhibitor is phenothiazine disclosed in U.S. Pat. No. 3,214,397. U.S. Pat. No. 4,010,211 teaches the replacement of part of a solid stabilizer system composed of butylated hydroxytoluene and p,p'-dialkyldiphenylamine with phenothiazine or its alkyl derivatives.

U.S. Pat. No. 4,275,173 discloses a solid synergistic stabilizer system consisting of a sterically hindered phenolic antioxidant, 4,4'-bis (α,α-dimethylbenzyl)diphenylamine and phenothiazine or its alkyl derivatives.

Surprisingly, it has been discovered that phenothiazine and certain alkyl derivatives of phenothiazine can be added to the liquid stabilizer composition composed of 2,6-di-tert-butyl-4-sec-butylphenol and a reaction product of diisobutylene, styrene and diphenylamine without destroying the liquid character of the stabilizer composition, while synergistically improving the overall scorch inhibiting properties of the stabilizer.

SUMMARY OF THE INVENTION

According to the invention, there are provided polyoxyalkylene polyether polyol compositions stabilized against oxidative degradation with a stabilizing amount of a synergistic mixture of 2,6-di-tert-butyl-4-sec-butylphenol, a reaction product of diisobutylene, styrene and diphenylamine, and phenothiazine compound of the formula I below, wherein the ratio of the phenol to the reaction product is about 1:5 to 5:1, and the ratio of the mixture of the phenol and the reaction product to the phenothiazine compound is about 5.0:0.1 to 4.0:1.0.

Another aspect of the invention concerns a method for the stabilization of a polyoxyalkylene polyether polyol against oxidative degradation and the use of the stabilized polyol together with polyisocyanates to prepare scorch stabilized polyurethane foam, wherein the polyol contains about 0.01 to 5.0 percent by weight of a synergistic mixture consisting of 2,6-di-tert-butyl-4-sec-butylphenol, a reaction product of diisobutylene, styrene and diphenylamine, and phenothiazine compound of the formula I

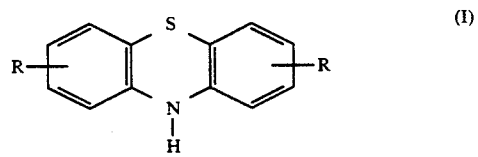

wherein each R is independently hydrogen or an alkyl group having 9 to 26 carbon atoms.

DETAILED DESCRIPTION OF THE INVENTION

The synergistic stabilizer or antiscorch composition is composed of known compounds. The liquid reaction product of diisobutylene, styrene and diphenylamine is prepared in the presence of a Friedel-Craft condensation catalyst according to the method described in U.S. Pat. No. 2,530,769 and is herein incorporated by reference. The weight ratio of diisobutylene to styrene ranges from about 2:1 to 5:1, preferably from 3:1 to 4:1 and the mole ratio of the hydrocarbon mixture containing diisobutylene and styrene to diphenylamine ranges from about 1.3:1 to 2:1, preferably from 1.3:1 to 1.5:1.

The composite liquid reaction product consists of octylated and styrenated derivatives such as p,p'-di-tert-octyldiphenylamine, p,p'-di-phenylethyldiphenylamine, p-tert-octyl-p'-phenylethyldiphenylamine, p-tert-octyldiphenylamine, p-phenylethyldiphenylamine and tri-tert-octyldiphenylamine. In addition, the product contains butylated derivatives which are produced when the tert-octyl group having the structural formula

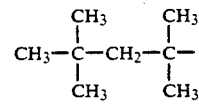

is split into two tert-butyl groups by the catalyst producing derivatives such as p-tert-butyldiphenylamine, p,p'-di-tert-butyldiphenylamine, p-tert-octyl-p'-tert-butyldiphenylamine, p-tert-butyl-p'-phenylethyldiphenylamine and minor amounts of other unidentified reaction products.

For preparation of the stabilizer of the invention, preferred are reaction products containing about 50 to 80 percent of mixed octylated derivatives, p-tert-octyldiphenylamine, p-tert-octyl-p'-tert-butyldiphenylamine, p,p'-di-tert-octyldiphenylamine, p-tert-octyl-p'-phenylethyldiphenylamine and tri-tert-octyldiphenylamine and about 50 to 20 percent of mixed butylated and styrenated diphenylamine derivatives.

The second component of the stabilizer composition, 2,6-di-tert-butyl-4-sec-butylphenol, is a known material available commerically under the trade name VANOX ® 1320 (distributed by R. T. Vanderbilt Company, Inc.)

The third component of the stabilizer composition is represented by formula I hereinabove. This includes unsubstituted phenothiazine, monoalkylphenothiazine, dialkylphenothiazine and mixtures thereof. The position of each alkyl group on each of the two aromatic groups is not critical. The alkyl groups represented by the radical R contains 9 to 26 carbon atoms. The alkyl groups may be straight chain or branched chain. The illustrative phenothiazine compounds include dinonylphenothiazine, didodecylphenothiazine, dioctadecylphenothiazine, dieicosylphenothiazine and ditetracosylphenothiazine.

To preserve the liquid character of the stabilizer system, the phenothiazine compound is dissolved in polyol or the polyether-isocyanate prepolymer and the desired amount of the stock solution added to the other two ingredients.

Unexpectedly, the phenol compound, the reaction product and the phenothiazine compound produce synergistic antioxidant effect in polyols when combined in certain critical ratios. Synergism is displayed when the phenol and the reaction product is present in the ratio of 1:5 to 5:1 and the mixture of the two components and the phenothiazine compound is present in the ratio of 5:0:0.1 to 4.0:1.0.

The antioxidant composition has a tendency to discolor upon standing. To prolong shelf-life of the composition, it is advantageous to add about 0.5 to 10.00 percent of trihydrocarbyl phosphite wherein the hydrocarbyl group may be independently selected from phenyl and alkyl groups. Preferred are alkyl derivatives having 5 to 13 carbons and higher. Particularly preferred are the compounds tridecyl phosphite and phenyl diisodecyl phosphite.

The compositions of the invention may be incorporated in the polyol precursors in an amount effective to produce the desired stability. Typically, an amount from about 0.01 to 5.0 percent will be sufficient. A preferred range is from about 0.3 to 1.0 percent by weight of the total polyol composition. Because of their liquid nature, the stabilizer composition may be incorporated into the polyol by simply stirring at ambient temperatures.

The polyol components which may be stabilized with the stabilizer composition of the invention include polyoxyalkylene polyether polyols having 2 to about 10 hydroxy groups. Particularly suitable polyols include those having a molecular weight of about 200 to 10,000 or higher. Preferred are polyols derived from diols and triols with a molecular weight ranging from 1000 for diols to 6000 for triols.

The polyether polyols possess two or more ether groups in the molecule. The polyols are derived from, among others, ethylene oxide, propylene oxide, epichlorohydrin, styrene oxide, diethylene glycol, triethylene glycol, trimethylolpropane, glycerine, hexanetriol, butanetriol and the like. Polyether polyols suitable for preparation of flexible polyurethane foams and methods of their preparation are described in K. C. Frisch and J. H. Saunders, ed., PLASTIC FOAMS, Part 1, 118-125 (1972).

In the preparation of flexible polyurethane foams, the stabilized polyol compositions are reacted with a polyisocyanate containing two or more —N=C=O groups per molecule in the presence of catalysts, surfactants, water and optionally, auxiliary blowing agents. Commerically available polyisocyanates include, among others, toluene-(2,4 and/or 2,6)diisocyanate, 4,4'-diphenylmethane diisocyanate, polyisocyanate from aniline-formaldehyde oligomers and aliphtaic isocyanates such as methylcyclohexane diisocyanate and the like.

Because of increased safety considerations, flexible and semiflexible polyurethane may contain flame retardants. The latter are known compounds containing phosphorus, antimony, boron, bismuth and halogen or combinations thereof. The polyurethane may contain other additives such as fillers, plasticizers, reodorants, ultraviolet and thermal stabilizers and the like.

The data hereinbelow are intended to illustrate, but not to limit the scope of the invention. Unless otherwise stated, all parts and percentages in the specification and claims are expressed by weight.

EXAMPLE

Scorch resistance of polyurethane foams was determined by microwave scorch test.

The specimens given in Table I were prepared by mixing the ingredients in a high intensity mixer, pouring into 35×35×13.75 cm cardboard box and recording the cream and rise time (health bubbles). The foamed specimens were placed in a microwave oven at 30% power for 7.5 minutes, rotated 180 degrees and microwaved for 7.5 minutes. Thereafter, the specimens were placed in a 121° C. forced air convection oven for 2 minutes to cure skin and then allowed to cure for 30 minutes at room temperature. The peak exotherm was measured for 10 minutes with a digital thermometer. The cured foam was cut open and discoloration was determined by visual inspection.

Specimen 1 contained no stabilizer and was severely discolored. Specimen 2 contained a 2.5:1 mixture of 2,6-di-tert-butyl-4-sec-butylphenol and reaction product of diisobutylene, styrene and diphenylamine (VANLUBE ® SL-HP distributed by R. T. Vanderbilt Company, Inc.), hereinafter 2-component stabilizer. Specimen 3 contained the same amount of the third component, phenothiazine. Both specimens were severely discolored. Specimens 4 to 7 contained the synergistic three component mixtures of the invention and showed very light to moderate discoloration as a result of improved scorch resistance.

TABLE I

| COMPONENTS | COMPOSITIONS, PARTS | | | | | | |
|---|---|---|---|---|---|---|---|
| | 1 | 2 | 3 | 4 | 5 | 6 | 7 |
| Polyether polyol[1] | 100.00 | 100.00 | 100.00 | 100.00 | 100.00 | 100.00 | 100.00 |
| Distilled water | 5.50 | 5.50 | 5.50 | 5.50 | 5.50 | 5.50 | 5.50 |
| Silicone surfactant[2] | 1.20 | 1.20 | 1.20 | 1.20 | 1.20 | 1.20 | 1.20 |
| Amine catalyst[3] | 0.47 | 0.47 | 0.47 | 0.47 | 0.47 | 0.47 | 0.47 |
| Flame retardant[4] | 7.00 | 7.00 | 7.00 | 7.00 | 7.00 | 7.00 | 7.00 |
| Tin catalyst[5] | 0.25 | 0.25 | 0.25 | 0.25 | 0.25 | 0.25 | 0.25 |
| Toluene diisocyanate | 70.80 | 70.80 | 70.80 | 70.80 | 70.80 | 70.80 | 70.80 |
| 2-Component stabilizer | — | 0.5 | — | 0.49 | 0.49 | 0.45 | 0.4 |
| Phenothiazine | — | — | 0.5 | 0.01 | — | 0.05 | 0.1 |
| Dinonylphenothiazine | — | — | — | — | 0.01 | — | — |

TABLE I-continued

| COMPONENTS | COMPOSITIONS, PARTS | | | | | | |
| --- | --- | --- | --- | --- | --- | --- | --- |
| | 1 | 2 | 3 | 4 | 5 | 6 | 7 |
| Scorch | Very Severe | Severe | Severe | Very Light | Moderate | Light | Moderate |

[1] NIAX R 16-52 manufactured by Union Carbide Company
[2] NIAX L-5750 manufactured by Union Carbide Company
[3] NIAX A 127 manufactured by Union Carbide Company
[4] FYROL FR 2 manufactured by Akzo
[5] NIAX D 19 manufactured by Union Carbide Company The above embodiments and illustrations have shown various aspects of the present invention. Other variations will be evident to those skilled in the art and such modifications are intended to be within the scope of the invention as defined in the appended claims.

What is claimed is:

1. A liquid stabilizer composition for reduction of scorch in polyurethane foams comprising
   (a) 2,6-di-tert-butyl-4-sec-butylphenol,
   (b) a reaction product of diisobutylene, styrene and diphenylamine wherein the weight ratio of diisobutylene to styrene ranges from about 2:1 to 5:1 and the mole ratio of the mixture of diisobutylene and styrene to diphenylamine ranges from about 1.3:1 to 2:1, and
   (c) phenothiazine compound of the formula

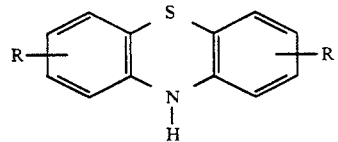

wherein each R is independently hydrogen or an alkyl group having 9 to 26 carbon atoms and wherein the ratio of the phenol compound to the reaction product is about 1:5 to 5:1 and the ratio of the mixture of components (a) and (b) to the phenothiazine compound is about 5.0:0.1 to 4.0:1.0.

2. The stabilizer composition according to claim 1 which further contains about 0.5 to 10.0 percent by weight of trihydrocarbyl phosphite wherein the hydrocarbyl is independently selected from phenyl and alkyl groups.

3. The stabilizer composition according to claim 1 which further contains about 0.5 to 10.0 percent by weight of tridecyl phosphite.

4. A polyether polyol composition stabilized against degradation comprises a major portion of a polyether polyol having 2 to 10 hydroxy groups and a minor stabilizing amount of a liquid stabilizer composition consisting of
   (a) 2,6-di-tert-butyl-4-sec-butylphenol,
   (b) a reaction product of diisobutylene, styrene and diphenylamine wherein the weight ratio of diisobutylene to styrene ranges from about 2:1 to 5:1 and the mole ratio of the mixture of diisobutylene and styrene to diphenylamine ranges from about 1.3:1 to 2:1, and
   (c) phenothiazine compound of the formula

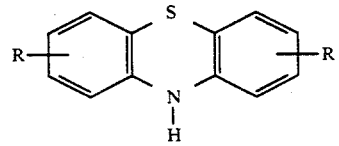

wherein each R is independently hydrogen or an alkyl group having 9 to 26 carbon atoms and wherein the ratio of the phenol compound to the reaction product is about 1:5 to 5:1 and the ratio of the mixture of components (a) and (b) to the phenothiazine compound is about 5.0:0.1 to 4.0:1.0.

5. The polyether polyol composition according to claim 4 wherein the stabilizer composition is present in the amount of 0.01 to 5.0 percent by weight.

6. The polyether polyol composition according to claim 4 wherein the stabilizer composition further contains about 0.5 to 10.0 percent by weight of trihydrocarbyl phosphite, wherein the hydrocarbyl is independently selected from phenyl and alkyl groups.

* * * * *

UNITED STATES PATENT AND TRADEMARK OFFICE
CERTIFICATE OF CORRECTION

PATENT NO. : 5,156,762

DATED : October 20, 1992

INVENTOR(S) : Richard A. Suhoza, Bruce R. Garney, Robert B. Lauder

It is certified that error appears in the above-indentified patent and that said Letters Patent is hereby corrected as shown below:

Title Page:

Item [57] Abstract at lines 5 to 6 and line 8, "phenothiazone" should be --phenothiazine--.

Column 4, line 14, "aliphtaic" should be --aliphatic--.

Signed and Sealed this

Twenty-eighth Day of September, 1993

Attest:

BRUCE LEHMAN

Attesting Officer        Commissioner of Patents and Trademarks